United States Patent
Liegl et al.

(10) Patent No.: US 9,312,040 B2
(45) Date of Patent: *Apr. 12, 2016

(54) ADAPTIVE X-RAY FILTER FOR CHANGING THE LOCAL INTENSITY OF X-RAYS

(71) Applicant: Siemens Aktiengesellschaft, München (DE)

(72) Inventors: Hans Liegl, Erlangen (DE); Reiner Franz Schulz, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 32 days.

This patent is subject to a terminal disclaimer.

(21) Appl. No.: 13/899,341

(22) Filed: May 21, 2013

(65) Prior Publication Data

US 2013/0322604 A1  Dec. 5, 2013

(30) Foreign Application Priority Data

May 31, 2012 (DE) .......... 10 2012 209 150

(51) Int. Cl.
*G21K 1/10* (2006.01)
*G21K 1/04* (2006.01)
*G02B 5/24* (2006.01)
(Continued)

(52) U.S. Cl.
CPC .. *G21K 1/10* (2013.01); *G02B 5/24* (2013.01); *G21K 1/04* (2013.01); *G02B 5/201* (2013.01); *G21K 1/02* (2013.01)

(58) Field of Classification Search
CPC ............ G21K 1/00; G21K 1/02; G21K 1/04; G21K 1/10; H01J 35/00; H01J 35/02; A61B 6/06; G02B 5/20; G02B 5/201; G02B 5/22; G02B 5/24; G02B 7/006; G02B 26/00; G02B 26/004; G02B 26/02; G02B 26/023; G02B 27/09; G02B 27/0938; G02B 27/0988
USPC ............ 378/16, 91, 145, 156–159, 204, 210; 359/226.3, 227, 228, 230, 237, 290, 359/291, 296, 321–323, 614, 885, 886, 891, 359/892, 896
See application file for complete search history.

(56) References Cited

U.S. PATENT DOCUMENTS

| | | |
|---|---|---|
| 3,755,672 A | 8/1973 | Edholm et al. |
| 5,242,372 A | 9/1993 | Carol |
| 5,559,853 A | 9/1996 | Linders et al. |

(Continued)

FOREIGN PATENT DOCUMENTS

| | | |
|---|---|---|
| DE | 2159365 A1 | 7/1972 |
| DE | 4422780 A1 | 1/1996 |

(Continued)

OTHER PUBLICATIONS

Liftmore Truck Cranes, "Hydraulic System for Electric Cranes", Oct. 22, 2004, pp. 1-2.*

(Continued)

*Primary Examiner* — Anastasia Midkiff
(74) *Attorney, Agent, or Firm* — Lempia Summerfield Katz LLC

(57) ABSTRACT

An adaptive x-ray filter for changing a local intensity of x-rays includes an x-ray absorbing first fluid and electrically deformable control elements. The electrically deformable control elements change a layer thickness of the first fluid at a site of a respective electrically deformable control element by at least partially displacing the x-ray absorbing first fluid.

19 Claims, 3 Drawing Sheets

(51) Int. Cl.
 *G02B 5/20* (2006.01)
 *G21K 1/02* (2006.01)

(56) References Cited

U.S. PATENT DOCUMENTS

| | | | |
|---|---|---|---|
| 5,625,665 A | 4/1997 | Fokkink et al. | |
| 5,666,396 A | 9/1997 | Linders et al. | |
| 5,751,786 A | 5/1998 | Welters et al. | |
| 5,768,340 A | 6/1998 | Geittner et al. | |
| 5,778,046 A | 7/1998 | Molloi et al. | |
| 5,878,111 A * | 3/1999 | Schulz | 378/158 |
| 5,881,127 A | 3/1999 | Molloi et al. | |
| 5,966,426 A | 10/1999 | Marra et al. | |
| 6,061,426 A | 5/2000 | Linders et al. | |
| 6,118,855 A | 9/2000 | Welters et al. | |
| 6,181,774 B1 * | 1/2001 | Prins et al. | 378/159 |
| 6,188,749 B1 | 2/2001 | Schiller et al. | |
| 6,198,806 B1 | 3/2001 | Prins | |
| 6,226,355 B1 | 5/2001 | Prins | |
| 6,252,939 B1 | 6/2001 | Young et al. | |
| 6,269,147 B1 | 7/2001 | Powell | |
| 6,275,568 B1 | 8/2001 | Prins et al. | |
| 6,289,081 B1 | 9/2001 | Weekamp et al. | |
| 6,370,228 B1 | 4/2002 | Mockler et al. | |
| 6,424,698 B1 * | 7/2002 | Weekamp et al. | 378/156 |
| 6,426,999 B2 | 7/2002 | Prins | |
| 6,430,265 B2 | 8/2002 | Prins et al. | |
| 6,438,211 B1 | 8/2002 | Weekamp et al. | |
| 6,440,527 B2 | 8/2002 | Prins et al. | |
| 6,453,012 B2 | 9/2002 | Herbert | |
| 6,453,013 B2 | 9/2002 | Prins | |
| 6,473,492 B2 | 10/2002 | Prins et al. | |
| 6,584,173 B2 | 6/2003 | Zwart et al. | |
| 6,611,578 B2 | 8/2003 | Snoeren et al. | |
| 6,836,535 B2 | 12/2004 | Toth et al. | |
| 7,082,189 B2 | 7/2006 | Yahata et al. | |
| 7,308,073 B2 | 12/2007 | Tkaczyk et al. | |
| 7,587,811 B2 | 9/2009 | Balamane et al. | |
| 7,652,273 B2 | 1/2010 | Cernasov | |
| 2013/0202091 A1 * | 8/2013 | Haider | 378/145 |
| 2013/0287179 A1 | 10/2013 | Fadler et al. | |
| 2013/0301807 A1 | 11/2013 | Bernhardt et al. | |
| 2013/0322604 A1 | 12/2013 | Liegl et al. | |

FOREIGN PATENT DOCUMENTS

| | | |
|---|---|---|
| DE | 19638621 C1 | 2/1998 |
| DE | 10019243 C1 | 10/2001 |
| DE | 69908494 T2 | 5/2004 |
| NL | 8903110 A | 7/1991 |

OTHER PUBLICATIONS

Wikipedia article on Hdraulic Drive System, last modified Nov. 5, 2014, http://en.wikipedia.org/wiki/Hydraulic_drive_system, pp. 1-6.*

German Office Action dated Oct. 25, 2012 for corresponding German Patent Application No. DE 10 2012 209 150.5 with English translation.

S. Ashley, "Artificial Muscles," Scientific American, Oct. 2003.

German Office action for related German Application No. 10 2012 206 953.4, dated Oct. 17, 2012, with English Translation.

* cited by examiner

ADAPTIVE X-RAY FILTER FOR CHANGING THE LOCAL INTENSITY OF X-RAYS

This application claims the benefit of DE 102012209150.5, filed on May 31, 2012, which is hereby incorporated by reference.

BACKGROUND

The present embodiments relate to an adaptive x-ray filter for changing a local intensity of x-rays.

In examinations with the aid of x-rays, a patient and/or organs of the patient in a region to be examined may exhibit a very different absorption behavior with respect to the applied x-rays. For example, with thorax imaging, the attenuation in the mediastinum (i.e., in the region in front of the lungs) is very great due to the organs arranged there. In the region of the lungs, the attenuation is very low. To obtain a useful image and to protect the patient, the applied dose may be set depending on the region, so that no more x-rays than are needed are supplied. In other words, a greater dose is to be applied in regions with greater attenuation than in regions with less attenuation. In some applications, only part of the examined region is to be imaged with significant diagnostic quality (e.g., with little noise). The surrounding parts may be important for orientation but not for the actual diagnosis. These surrounding regions may be mapped with a lower dose in order to reduce the entire dose applied.

Filters are used in order to attenuate x-rays. A filter of this type is known, for example, from DE 44 22 780 A1. The filter has a housing with a controllable electrode matrix that generates an electric field. The electric field acts on a fluid connected to the electrode matrix, in which ions absorbing x-rays are present. The ions absorbing x-rays are freely moveable and roam around as a function of the applied field. With such a corresponding electric field embodiment, correspondingly more or fewer ions may be accumulated in the region of one or more electrodes to change the absorption behavior of the filter locally.

Electroactive polymers (EAP) that change form based on application of an electrical voltage are known from the prior art. One example of an electroactive polymer is a dielectric elastomer. A dielectric elastomer converts electrical energy directly into mechanical work. An actuator based on a dielectric elastomer may be constructed, for example, by coating an elastomer film on both sides with electrodes. An electric voltage may be applied to the elastomer film. The applied voltage compresses the elastomer film in the thickness direction, where the elastomer film extends laterally. With this process, the elastomer film may perform work and thus act as an actuator. If the voltage between the electrodes is removed again, the elastomer film reassumes an original form.

SUMMARY AND DESCRIPTION

The present embodiments may obviate one or more of the drawbacks or limitations in the related art. For example, a further adaptive x-ray filter for changing the local intensity of x-rays is provided.

In one example, orthogonally arranged, electrically deformable molding elements locally able to change the layer thickness of an x-ray absorbing first fluid in a plane are provided. The local absorption behavior of the filter changes as a result. When the layer thickness is minimal, more x-rays reach an object than when the layer thickness is greater. The x-rays may therefore be modulated in two dimensions.

In one embodiment, an adaptive x-ray filter for changing the local intensity of x-rays is provided. The x-ray filter includes an x-ray absorbing first fluid (e.g., Galinstan) and electrically deformable control elements. The control elements change the layer thickness of the first fluid at a site of the respective control element by at least partially displacing the first fluid. Control elements are also known under the term actuators and refer to converters with which electronic signals are converted into mechanical movement or other physical variables. One or more of the present embodiments are advantageous in that the radiation field of x-rays may be modulated simply, precisely and rapidly using the adaptive x-ray filter.

In another example, the control elements may be arranged in a plane that is at right angles to the x-rays.

In one embodiment, the x-ray filter includes a flexible membrane that is transparent for x-rays. The flexible membrane separates the first fluid from the control elements. The membrane may be moved by the control elements. The control elements may be arranged on the membrane. The layer thickness of the first fluid is therefore changed locally with the aid of the membrane.

In another embodiment, the x-ray filter includes a second fluid arranged below the membrane. The second fluid is transparent for x-rays. The second fluid includes an x-ray absorption characteristic that is similar to the x-ray absorption characteristic of the control elements. As a result, unwanted structures in the x-ray images are prevented by the control elements. The control elements may be surrounded by the second fluid.

In one embodiment, the control elements may include at least one electroactive element. When a voltage is applied, electroactive elements constrict (e.g., contract) or extend (e.g., expand). As a result, a deflection of the membrane may be achieved, and thus, the x-ray-absorbing length of the first fluid may be modulated. As a result, a non-uniform x-ray field may be set.

In another embodiment, the control elements may also include an electroactive polymer. A control element based on an electroactive polymer (e.g., in the form of a dielectric elastomer) may be constructed by an elastomer film coated with electrodes on both sides. An electric voltage is applied to the elastomer film. When the voltage is applied, the elastomer film constricts in the thickness direction, whereby the elastomer film extends laterally. This extension produces a deflection of the membrane. When the voltage between the electrodes is removed again, the elastomer film reassumes an original form.

In another embodiment, a lifting apparatus may be arranged on a control element. The lifting apparatus increases a travel (e.g., a deflection) of the control element.

In one embodiment, a method for changing the local intensity of x-rays using an adaptive x-ray filter is provided. Control elements of the adaptive x-ray filter arranged in a plane are electrically deformed and/or changed in terms of length by an electrical cause. As a result, the layer thickness of an x-ray absorbing first fluid irradiated by the x-rays is changed at a site of the respective control element by the control elements being able to at least partially displace the first fluid.

DETAILED DESCRIPTION

Figure 1:
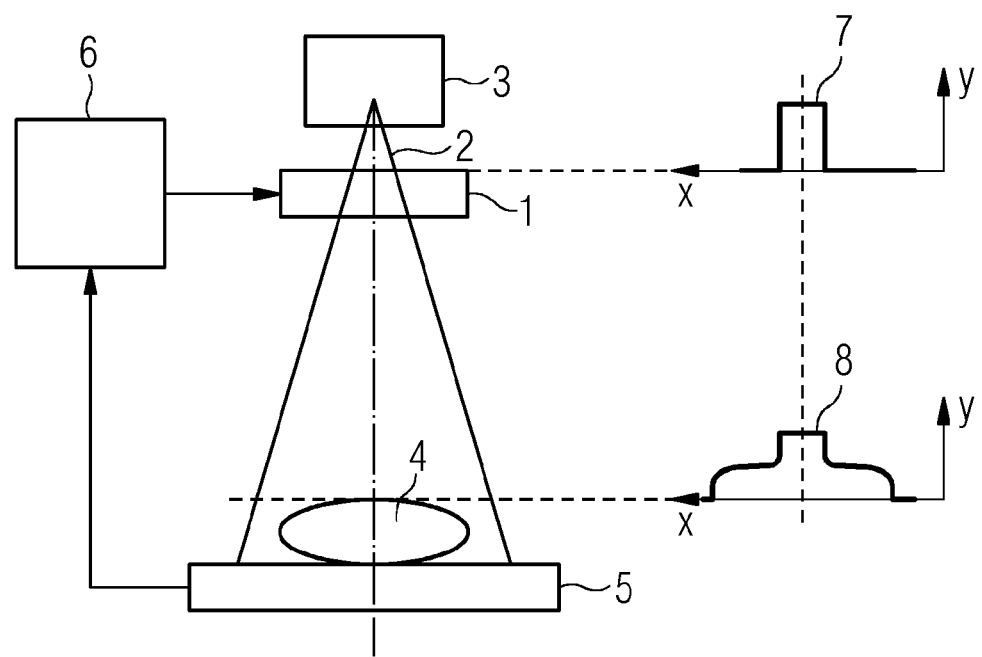
FIG. 1 shows a schematic representation of the functional principle of one embodiment of an adaptive x-ray filter.

FIG. 1 shows the functional principle of an adaptive x-ray filter. A location-dependent attenuation of x-rays 2 may be achieved by use of an adaptive x-ray filter 1. The x-rays 2 are generated by an x-ray source 3, penetrate the adaptive x-ray filter 1 and a patient 4, and are measured by an x-ray detector 5. The local attenuation of the x-rays 2 is controlled with a control unit 6 by the adaptive x-ray filter 1.

An intensity profile 7 of the x-rays 2 upstream of the adaptive filter 1 is shown schematically in the top right in FIG. 1. The intensity y is shown via axis x, which specifies the location. An approximately uniform course of the intensity y is shown. An intensity profile 8 of the x-rays 2 is shown schematically in the bottom right in FIG. 1 after passing through the adaptive x-ray filter 1. The change in local intensity y specified by the adaptive x-ray filter 1 is shown by the form of the intensity profile 8.

Figure 2:
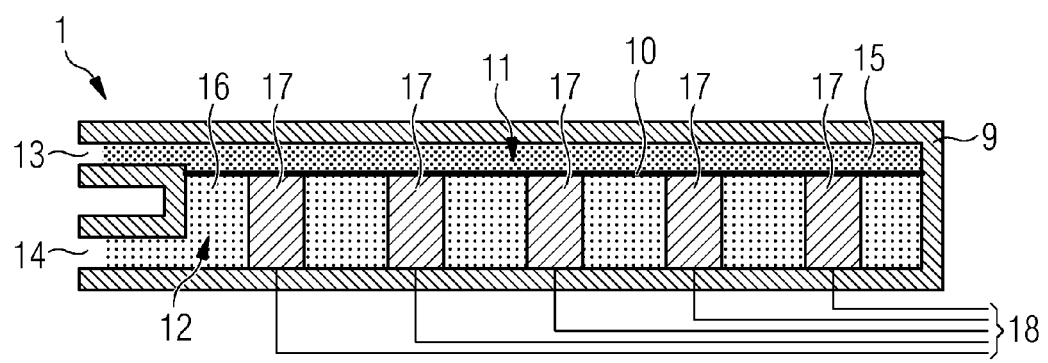
FIG. 2 shows a cross-sectional view through one embodiment of an adaptive x-ray filter having control elements.

FIG. 2 shows a cross-section through one embodiment of an adaptive x-ray filter having control elements. The adaptive x-ray filter 1 includes a housing 9 that is separated into a first chamber 11 with a first fluid 15, and a second chamber 12 with a second fluid 16, by a flexible membrane 10. Each of the chambers 11, 12 has an inflow/outflow 13, 14, by which the fluids 15, 16 may be supplied/drained off. The first fluid 15 is an x-ray absorbing fluid. The second fluid 16 is a fluid transparent for x-rays.

Control elements 17 such as, for example, actuators are arranged on a lower side of the membrane 10. The control elements 17 and the second fluid 15 include, for example, comparable x-ray absorption properties. Thus, no unwanted structures are visible in a created x-ray image. The first and second fluids 15, 16 may be filled through the inflows/outflows 13, 14, and a differential pressure may be applied to the membrane 10. The fluids 15, 16 may be supplied or drained off through the inflow/outflow openings 13, 14 depending on the deflection of the membrane 10. Control signals such as, for example, a voltage may be sent via activation lines 18 to the control elements 17. The control elements 17 constrict (e.g., contract) or extend (e.g., expand), thereby causing the membrane 10 to deflect.

Figure 3:
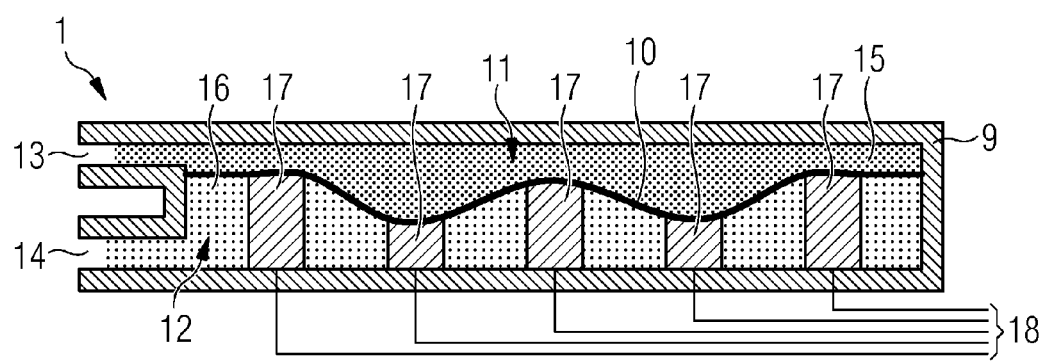
FIG. 3 shows a cross-sectional view through one embodiment of an adaptive x-ray filter having differently adjusted control elements.

FIG. 3 shows a cross-section through one embodiment of an adaptive x-ray filter with differently adjusted control elements. An adaptive x-ray filter 1 with the same structure to that in FIG. 2 is shown. Control signals such as, for example, a voltage may be sent via the activation lines to the control elements 17. The control elements 17 extend very differently as a result. A deflection of the membrane 10 and thus a modulation of the absorbing length of the first fluid 15 are thus achieved. As a result, a non-uniform x-ray image may be set.

Figure 4:
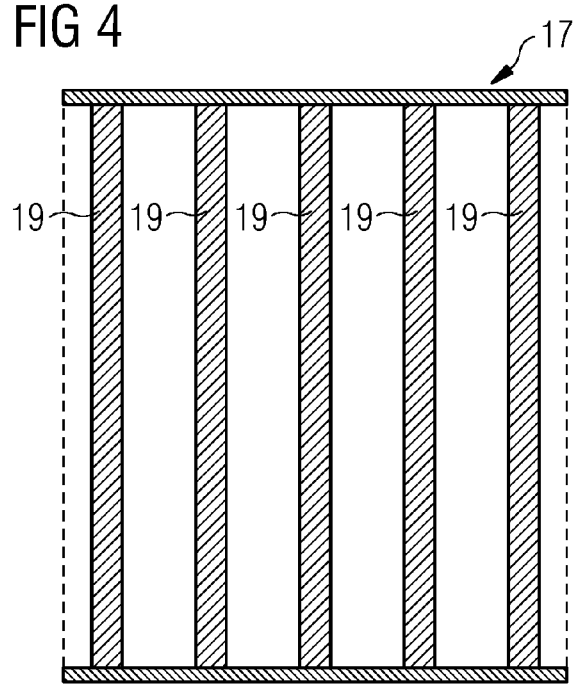
FIG. 4 shows a cross-sectional view through one embodiment of a control element with electroactive elements.

FIG. 4 shows a cross-section through one embodiment of a control element having electroactive elements. A control element 17 includes a number of electroactive elements 19 that extend when a voltage is applied. If the voltage is removed again, the electroactive elements 19 reassume an original form of the electroactive elements 19. In order to prevent unwanted structures on an x-ray image to be created, the electroactive elements 19 have an x-ray transparent property that is similar to the surrounding materials (e.g., a fluid (not shown) that surrounds the electroactive elements 19).

Figure 5:
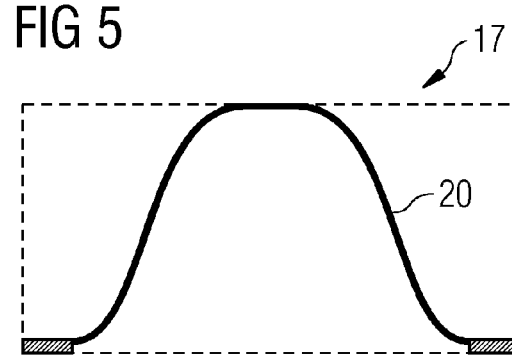
FIG. 5 shows a cross-sectional view through one embodiment of a control element having an electroactive polymer in an extended state.

FIG. 5 shows a cross-section through one embodiment of a control element having an electroactive polymer in the extended state. A control element 17 includes a dielectric elastomer film 20 coated on both sides with electrodes (not shown), to which an electric voltage may be applied. The dielectric elastomer film 20 is compressed in the thickness direction by the applied voltage, whereby the dielectric elastomer film 20 extends laterally. This extension enables a deflection of a membrane (not shown). When the voltage between the electrodes is removed, the dielectric elastomer film 20 reassumes an original 2-dimensional form.

Figure 6:
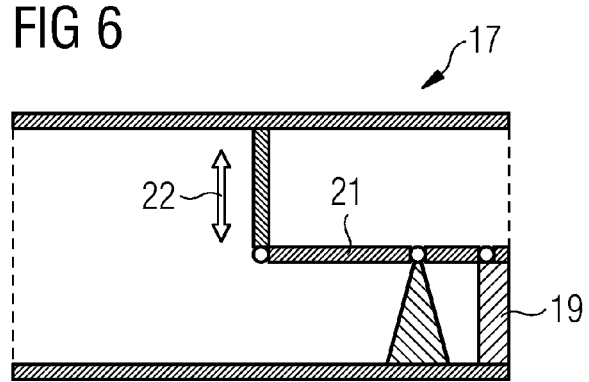
FIG. 6 shows a cross-sectional view through one embodiment of a control element with a lifting apparatus.

FIG. 6 shows a cross-section through one embodiment of a control element with a lifting apparatus. A control element 17 includes an electroactive element 19 that shortens when an electric voltage is applied. The electroactive element 19 is actively connected to a lifting apparatus 21. The lifting apparatus 21 is arranged in the control element 17 such that a shortening of the electroactive element 19 results in a deflection 22. Due to the lifting effect, the deflection is greater than the shortening of the electroactive element 19. The materials used for the lifting apparatus 21, the electroactive element 21, a fluid (not shown) surrounding the electroactive element 19, and the lifting apparatus 21 all include a similar x-ray-transparent property. As a result, unwanted structures on an x-ray image to be created are avoided.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. An adaptive x-ray filter for changing a local intensity of x-rays, the adaptive x-ray filter comprising:
   a first fluid operable to absorb x-rays;
   a plurality of control elements that is electrically deformable and is operable to change a layer thickness of the first fluid at a site of a respective control element of the plurality of control elements by at least partially displacing the first fluid; and
   a flexible membrane that is transparent for the x-rays, the flexible membrane separating the first fluid from the plurality of control elements,
   wherein the flexible membrane is movable by the plurality of control elements.

2. The adaptive x-ray filter as claimed in claim 1, wherein the plurality of control elements is arranged in a plane at right angles to the x-rays.

3. The adaptive x-ray filter as claimed in claim 1, further comprising a second fluid that is x-ray transparent and is arranged below the membrane, an x-ray absorption property of the second fluid being similar to an x-ray absorption property of the plurality of control elements.

4. The adaptive x-ray filter as claimed in claim 3, wherein the plurality of control elements is surrounded by the second fluid.

5. The adaptive x-ray filter as claimed in claim 1, wherein the plurality of control elements comprises at least one electroactive element.

6. The adaptive x-ray filter as claimed in claim 1, wherein each control element of the plurality of control elements includes an electroactive polymer.

7. The adaptive x-ray filter as claimed in claim 1, further comprising a lifting apparatus arranged on a control element of the plurality of control elements, the lifting apparatus operable to increase travel of the control element.

8. The adaptive x-ray filter as claimed in claim 5, further comprising a second fluid that is x-ray transparent and is arranged below the membrane, an x-ray absorption property of the second fluid being similar to an x-ray absorption property of the plurality of control elements.

9. The adaptive x-ray filter as claimed in claim 8, wherein the plurality of control elements is surrounded by the second fluid.

10. The adaptive x-ray filter as claimed in claim 2, wherein the plurality of control elements comprises at least one electroactive element.

11. The adaptive x-ray filter as claimed in claim 4, wherein the plurality of control elements comprises at least one electroactive element.

12. The adaptive x-ray filter as claimed in claim 2, wherein each control element of the plurality of control elements includes an electroactive polymer.

13. The adaptive x-ray filter as claimed in claim 4, wherein each control element of the plurality of control elements includes an electroactive polymer.

14. The adaptive x-ray filter as claimed in claim 5, wherein each control element of the plurality of control elements includes an electroactive polymer.

15. The adaptive x-ray filter as claimed in claim 2, further comprising a lifting apparatus arranged on a control element of the plurality of control elements, the lifting apparatus operable to increase travel of the control element.

16. The adaptive x-ray filter as claimed in claim 4, further comprising a lifting apparatus arranged on a control element of the plurality of control elements, the lifting apparatus operable to increase travel of the control element.

17. The adaptive x-ray filter as claimed in claim 6, further comprising a lifting apparatus arranged on a control element of the plurality of control elements, the lifting apparatus operable to increase travel of the control element.

18. A method for changing a local intensity of x-rays using an adaptive x-ray filter, the method comprising:
   electrically deforming, electrically-induced changing, or electrically deforming and electrically-induced changing in length of a plurality of control elements of the adaptive x-ray filter arranged in a plane; and
   changing a layer thickness of an x-ray absorbing first fluid being irradiated by the x-rays at a site of a respective control element of the plurality of control elements, the changing comprising at least partially displacing, by a flexible membrane movable by the plurality of control elements, the x-ray absorbing first fluid, the flexible membrane being transparent for the x-rays and separating the first fluid from the plurality of control elements.

19. An adaptive x-ray filter for changing a local intensity of x-rays, the adaptive x-ray filter comprising:
   a first fluid operable to absorb x-rays;
   a plurality of control elements that is electrically deformable and is operable to change a layer thickness of the first fluid at a site of a respective control element of the plurality of control elements by at least partially displacing the first fluid; and
   a lifting apparatus arranged on a control element of the plurality of control elements, the lifting apparatus operable to increase travel of the control element.

* * * * *